Figure 1:
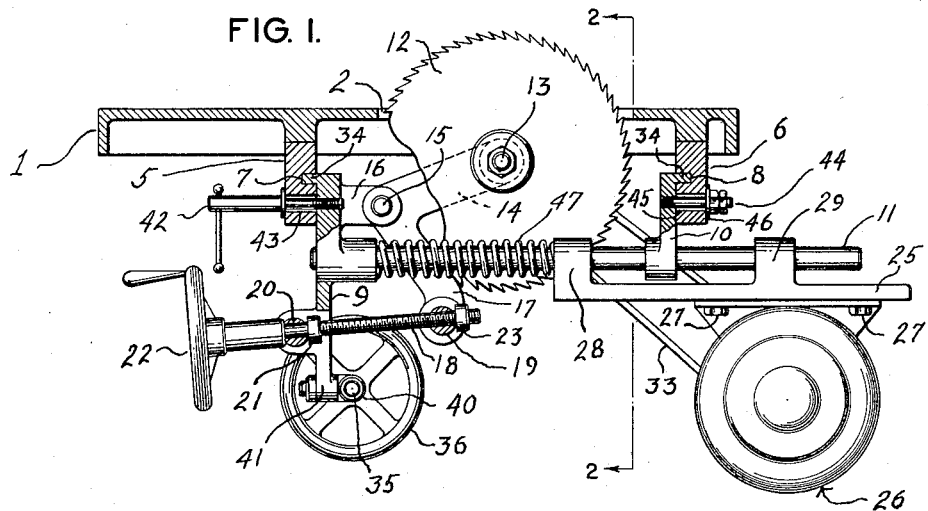

Aug. 14, 1956  O. F. MASTRIFORTE  2,758,615

MOUNTING FOR TILTING ARBOR ROTARY MITER SAWS

Filed March 11, 1954

INVENTOR
OTIL F. MASTRIFORTE
BY Chapin & Neal
ATTORNEYS

United States Patent Office 2,758,615
Patented Aug. 14, 1956

2,758,615

MOUNTING FOR TILTING ARBOR ROTARY MITER SAWS

Otil F. Mastriforte, West Hartford, Conn., assignor to Hampden Brass and Aluminum Company, Springfield, Mass., a corporation of Massachusetts Application March 11, 1954, Serial No. 415,522

3 Claims. (Cl. 143—36)

This invention relates to an improvement in mountings for circular miter saws, and the motors by which they are driven.

The principal object is to provide a simplified mounting which is positive in operation and automatically maintains proper belt tension between the motor and saw.

Other and further objects residing in the details of construction will be made apparent from the disclosure of the accompanying drawing and the following specification and claims.

Figure 2:
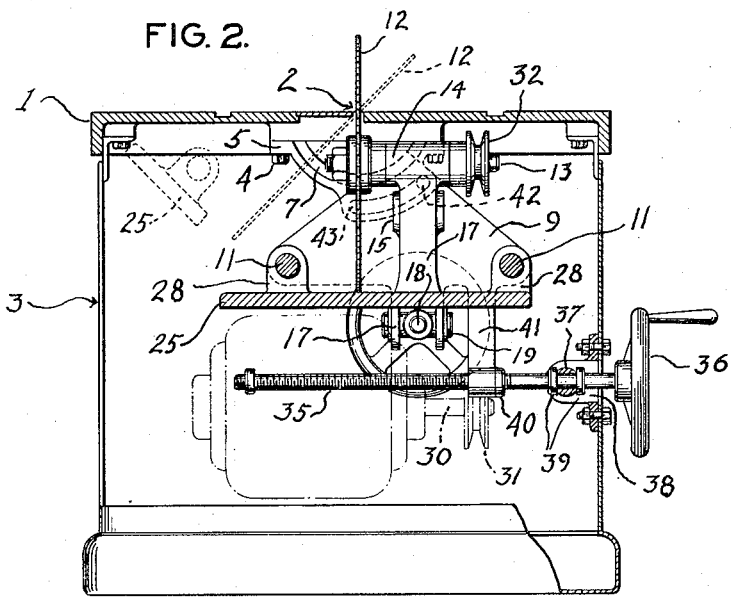

In the drawing:

Fig. 1 is a side elevational view, partly in section of a saw and mounting embodying the invention; and Fig. 2 is a sectional view substantially on line 2—2 of Fig. 1.

Referring to the drawings, a table is shown at 1, having an elongated saw slot 2 and supported on any suitable frame structure generally indicated at 3. Secured to the underside of the table in any suitable manner, as by machine bolts 4, are two spaced, parallel brackets 5 and 6, formed with respective opposed, arcuate guide grooves 7 and 8 centered on the center line of slot 2.

Suspended from said brackets is a frame for supporting the saw and a motor for driving the saw. This frame comprises spaced end members 9 and 10 which are connected by rods 11 to which they are fixed, as by set screws, not shown, the ends of the rods extending outwardly beyond the end member 10.

The saw 12 is fixed to a shaft 13 rotatably mounted below the table 1 in an arm 14 of a bell crank pivoted at 15 to a bracket 16 extending from end member 9. The other arm 17 of the bell crank is adjustably connected by a rotatable screw 18, threaded through a nut 19 pivoted to arm 17, and rotatably mounted in a swivel bearing 20 formed in end member 9 in which it is held against axial movement by a fixed collar 21 and the hub of a hand wheel 22 fixed to the screw. As will be apparent the extension of saw 12 through slot 2 can be adjusted by rotation of handwheel 22. A stop collar 23 limits the upward movement of the saw.

Slidably mounted on rods 11 is a motor supporting member comprising a plate 25 to which the motor 26 is fixed as by machine bolts 27. Plate 25 is slidably mounted on rods 11 by spaced pairs of apertured lugs 28 and 29. As shown in Fig. 1, lugs 28 engage the rods 11 intermediate the ends members 9 and 10 while lugs 29 are positioned on the rods outwardly of end member 10. As shown in phantom in Fig. 2, the shaft 30 of the motor carries a pulley 31, which is connected to a pulley 32, fixed to saw shaft 13, by a drive belt 33, Fig. 1.

The end members 9 and 10 are provided with arcuate flanges 34 which ride in the guide-ways 7 and 8 whereby the frame comprising end members 9 and 10 and rods 11 together with the parts carried thereby may be rotated about the centerline of slot 2 as an axis to adjust the angularity of the saw 12 as indicated in dotted lines in Fig. 2. Such rotation is effected by a screw 35 provided with a handwheel 36 and journaled in a bearing 37 swivelled to a bracket 38 supported by machine frame 3. Collars 39 fixed to screw 35 on opposite sides of bearing 37 prevent axial movement of the screw in the bearing. Screw 35 is threaded in a nut 40 swivelled to a bracket 41 extending downwardly from end member 9.

The saw is clamped in adjusted angular position by a shouldered pin 42 extending through an arcuate slot 43 formed in bracket 5 concentric with groove 7, the end of pin 42 being threaded into end member 9. Flange 34 is held in groove 8 by a bolt 44 threaded into end member 10 through an arcuate slot 45, formed in bracket 6, a washer 46 slidably engaging the outer face of bracket 6.

Coiled compression springs 47, one of which is shown in Fig. 1, surround rods 11 and engage between end member 9 and lugs 28 to maintain a driving tension on belt 33 in all adjusted positions of the saw and motor. Springs 47 yield as the saw is raised by handwheel 22, thus slightly increasing the belt tension for a greater depth of cut and the resulting increase of load on the saw.

What is claimed is:

1. In a miter saw machine having a circular saw and a table provided with an elongated slot through which the saw extends; spaced brackets extending downwardly from the underside of the table and each provided with an arcuate guide groove centered on the centerline of said slot, a frame having spaced end members formed with arcuate flanges slidably engaging respectively in said guide grooves, said end members being connected by spaced parallel rods, the saw being pivotally mounted on one of said end members for movement through said slot in a plane radial to the guide grooves, a motor, a support for the motor slidably mounted on said rods, a drive belt connecting said motor and saw and springs interposed between said motor support and the end member to which the saw is pivoted to maintain driving tension on the belt.

2. In a miter saw machine having a table provided with an elongated slot, a frame supporting said table, spaced brackets extending downwardly from the underside of the table each provided with an arcuate guide groove centered on the centerline of said slot, a frame suspended from said brackets, said suspended frame including first and second end members having respective arcuate flanges engaging respectively in said grooves, spaced rods, parallel to said slot, connecting and fixed to said end members, a bell crank pivoted to said first end member, a shaft journaled in one arm of the bell crank, a circular saw fixed to said shaft and extending through said slot in a plane radial to said grooves, an adjustable link connecting the other arm of the bell crank and said first end member to vary the extension of the saw through said slot, a motor, a support for the motor provided with first and second pairs of lugs slidably engaging said rods, said first pair of lugs being positioned between said end members and said second pair being positioned outwardly of said second end member, a driving belt connecting said motor and saw shaft, a spring surrounding each of said rods and compressed between the first end member and said first pair of lugs to maintain driving tension on the belt, and an adjustable link connecting one of said end members and said table supporting frame and extending at right angles to said slot for adjusting said suspended frame in said guide grooves to vary the angularity of the plane of the saw with respect to the plane of the table.

3. In a miter saw machine having a table provided with an elongated slot, a frame positioned below the table and connected thereto for arcuate movement about the centerline of the slot, a circular saw mounted on said frame for movement through the slot in a plane radial to said arcuate movement to adjust the extension of the saw through the slot, a motor support fixed to the frame independently of the saw mounting, a motor slidably mounted on said support below the axis of the saw for movement parallel to the slot, a driving belt connecting the motor and saw and a compression spring compressed between the motor and said frame, said spring urging the motor along the support and away from the saw axis to resiliently maintain the motor in driving relation with the saw and, through said belt, opposing increased extension of the saw through the slot to automatically increase and decrease the resilient tension on the belt as the extension of the saw through the slot is respectively increased or decreased.

References Cited in the file of this patent
UNITED STATES PATENTS

| | | |
|---|---|---|
| 1,570,591 | Mercer | Jan. 19, 1926 |
| 1,922,151 | Boice et al. | Aug. 15, 1933 |
| 2,067,652 | Tautz | Jan. 12, 1937 |
| 2,121,069 | Collins | June 21, 1938 |
| 2,704,560 | Woessner | Mar. 22, 1955 |